US012767130B2

(12) United States Patent
Lee et al.

(10) Patent No.: US 12,767,130 B2
(45) Date of Patent: Oct. 20, 2026

(54) AUTONOMOUS DRIVING VEHICLE AND CONTROL METHOD THEREOF

(71) Applicants: Hyundai Motor Company, Seoul (KR); Kia Corporation, Seoul (KR)

(72) Inventors: Sang Wook Lee, Hwaseong-Si (KR); Chang Wan Seo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 4 days.

(21) Appl. No.: 18/969,446

(22) Filed: Dec. 5, 2024

(65) Prior Publication Data

US 2025/0296559 A1 Sep. 25, 2025

(30) Foreign Application Priority Data

Mar. 21, 2024 (KR) ........................ 10-2024-0039244

(51) Int. Cl.
*B60W 30/12* (2020.01)

(52) U.S. Cl.
CPC ....... *B60W 30/12* (2013.01); *B60W 2420/403* (2013.01); *B60W 2530/201* (2020.02); *B60W 2552/53* (2020.02); *B60W 2554/801* (2020.02)

(58) Field of Classification Search
CPC ...... B60W 30/12; B60W 50/14; B60W 50/60; B60W 50/001; B60W 2420/403;
(Continued)

(56) References Cited

U.S. PATENT DOCUMENTS 8,090,516 B2 * 1/2012 Yonezawa ............. B60W 30/12
701/82
2008/0238718 A1 * 10/2008 Jung .................... B62D 15/029
340/901

(Continued)

FOREIGN PATENT DOCUMENTS

CN 115828517 A * 3/2023
CN 116674584 A * 9/2023 ............ B60W 50/14

OTHER PUBLICATIONS

An et al., "A Novel Approach to Provide Lane Departure Warning Using Only One Forward-Looking Camera," International Symposium on Collaborative Technologies and Systems (CTS'06), Las Vegas, NV, USA, 2006, pp. 356-362. (Year: 2006).*

(Continued)

*Primary Examiner* — Dino Kujundzic
(74) *Attorney, Agent, or Firm* — Banner & Witcoff, Ltd.

(57) ABSTRACT

An autonomous vehicle may include sensors and a processor, wherein the processor is configured to extract specification information of the autonomous vehicle; collect, via the sensors, lane information from a current lane in which the autonomous vehicle is traveling; determine, based on the collected lane information and a preset first lane departure reference distance, whether a departure from lines of the current lane occurs; if the departure from the lines of the current lane occurs due to a departure from the first lane departure reference distance, analyze the specification information of the autonomous vehicle and the lane information and calculate a second lane departure reference distance calibrated from the first lane departure reference distance; and control driving of the autonomous vehicle based on the calculated second lane departure reference distance.

20 Claims, 5 Drawing Sheets

(58) Field of Classification Search
CPC ..... B60W 2050/143; B60W 2530/201; B60W 2520/06; B60W 2552/53; B60W 2552/30; B60W 2554/801
See application file for complete search history.

(56) References Cited

U.S. PATENT DOCUMENTS

| | | | | |
|---|---|---|---|---|
| 2009/0021358 | A1* | 1/2009 | Lee | B60W 30/12 340/436 |
| 2018/0170378 | A1* | 6/2018 | Oka | B60W 30/12 |
| 2020/0272835 | A1* | 8/2020 | Cheng | B60W 50/14 |
| 2021/0221364 | A1* | 7/2021 | Mase | B60W 30/18163 |
| 2024/0067173 | A1* | 2/2024 | Wang | B60W 50/16 |
| 2024/0067267 | A1* | 2/2024 | Uchida | B60Q 9/00 |
| 2025/0050888 | A1* | 2/2025 | Kim | B60W 30/18163 |

OTHER PUBLICATIONS

CN 115828517 A—machine translation (Year: 2023).*
CN 116674584 A—machine translation (Year: 2023).*

* cited by examiner

AUTONOMOUS DRIVING VEHICLE AND CONTROL METHOD THEREOF

CROSS-REFERENCE TO RELATED APPLICATION

This application claims the benefit of Korean Patent Application No. 10-2024-0039244, filed on Mar. 21, 2024, which is hereby incorporated by reference as if fully set forth herein.

TECHNICAL FIELD

The present disclosure relates to an autonomous vehicle and a control method thereof.

BACKGROUND

Autonomous vehicles may reduce driver fatigue by performing driving, braking, and steering, in place of drivers. However, to successfully replace manned driving, autonomous vehicles must be able to adaptively respond to the surrounding conditions that change in real time during driving.

For example, lane keeping assist (LKA) is a lane departure preventing system configured to prevent a lane departure by detecting a lane departure during driving and performing corrected steering. LKA may include recognizing lanes using a front camera and performing corrected steering in response to a detected lane departure to prevent the lane departure.

For example, while LKA is operating, an autonomous vehicle may notify a driver of such a lane departure through haptic, audible, and/or cluster warnings.

While LKA is operating via one or more processors of the autonomous vehicle, the autonomous vehicle may use predetermined logic to apply a simple calculation value obtained by subtracting half the width of the vehicle to a camera-recognized distance value. This may result in an error (e.g., of 4 to 6 centimeters (cm)) because a heading angle and/or a front wheel axle-to-camera longitudinal distance value are not applied. The error may cause a delay in a lane departure warning (LDW) time and/or an LKA control time, which may increase the likelihood of non-compliance with EuroNCAP, NHTSA, or GSR regulations, for example.

The matters described in this Background section are only for enhancement of understanding of the background of the disclosure, and should not be taken as acknowledgement that they correspond to prior art already known to those skilled in the art.

SUMMARY

The following summary presents a simplified summary of certain features. The summary is not an extensive overview and is not intended to identify key or critical elements.

Systems, apparatuses, and methods are described an autonomous driving vehicle and control method thereof. A method of controlling a vehicle may comprise: receiving, by a processor executing computer instructions stored in a memory and via at least one sensor of the vehicle, lane information of a lane in which the vehicle is traveling; determining, by the processor and based on the lane information and a first lane departure reference distance, that the vehicle is departing the lane; determining, based on specification information of the vehicle and the lane information, a second lane departure reference distance; and controlling, by the processor and based on the second lane departure reference distance, driving of the vehicle.

A method of controlling a vehicle may also, or alternatively, comprise receiving, by a processor and from a camera of the vehicle, lane information of a lane in which the vehicle is traveling; determining, by the processor and based on the lane information and a first distance between the camera and a line of the lane satisfying a lane departure criterion, that the vehicle is departing the lane towards the line; determining, based on specification information of the vehicle and the lane information, a second distance between the line and a front wheel, of the vehicle, towards the line; and controlling, by the processor and based on the second distance, autonomous driving of the vehicle.

A vehicle may comprise at least one sensor; and a processor configured to execute computer instructions stored in a memory. The computer instructions may be, when executed by the processor, configured to cause the vehicle to: receive, via the at least one sensor, lane information of a lane in which the vehicle is traveling; determine, based on the lane information and a first lane departure reference distance, that the vehicle is departing the lane; determine, based on specification information of the vehicle and the lane information, a second lane departure reference distance; and control, based on the second lane departure reference distance, driving of the vehicle.

A vehicle may comprise a camera; and a processor configured to execute computer instructions stored in a memory. The computer instructions may be, when executed by the processor, configured to cause the vehicle to: receive, from the camera of the vehicle, lane information of a lane in which the vehicle is traveling; determine, based on the lane information and a first distance between the camera and a line of the lane satisfying a lane departure criterion, that the vehicle is departing the lane towards the line; determine, based on specification information of the vehicle and the lane information, a second distance between the line and a front wheel, of the vehicle, towards the line; and control, based on the second distance, autonomous driving of the vehicle.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE DISCLOSURE

Figure 1:
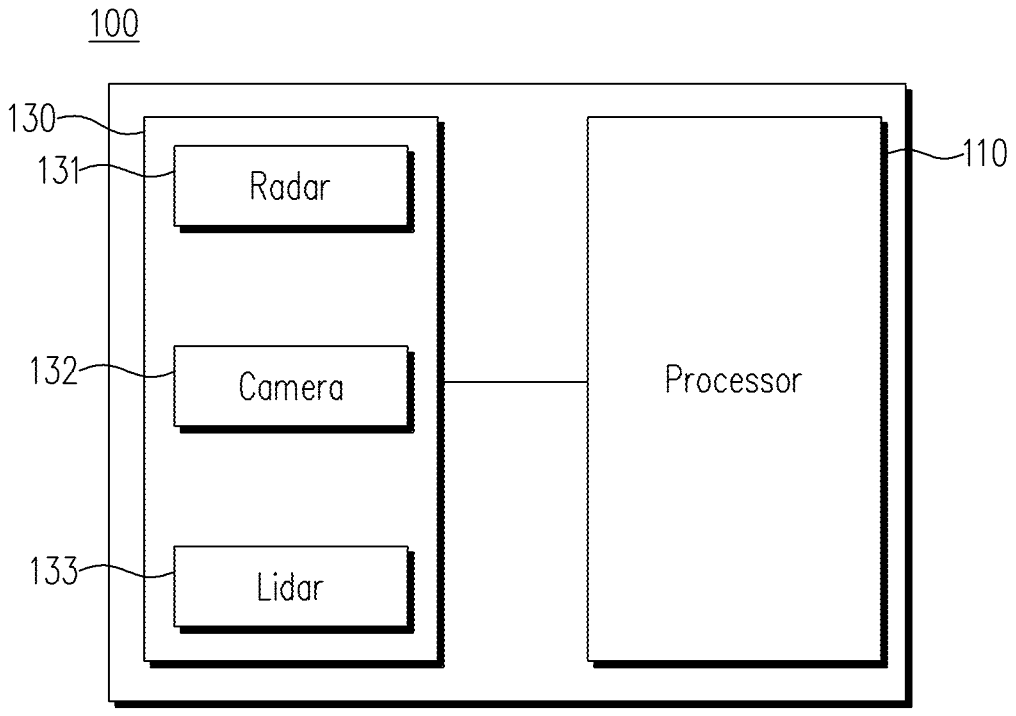
FIG. 1 is a block diagram illustrating an autonomous vehicle according to an example of the present disclosure.

Hereinafter, examples of the present disclosure will be described in detail with reference to the accompanying drawings, and the same or similar elements will be given the same reference numerals regardless of reference symbols, and a repeated description thereof will be omitted. Further, when describing the examples, when it is determined that a detailed description of related publicly known technology obscures the gist of the examples described herein, the detailed description thereof will be omitted.

As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. In addition, when describing the examples with reference to the accompanying drawings, like reference numerals refer to like components and a repeated description related thereto will be omitted.

Throughout the present disclosure, references to components, units, or modules generally refer to items that logically can be grouped together to perform a function or group of related functions. Like reference numerals are generally intended to refer to the same or similar components. Components, units, and modules may be implemented in software, hardware or a combination of software and hardware. The components, units, modules, and/or functions described above may be implemented and/or performed by one or more processors. For examples, the components, units, and/or modules may include processor(s), microprocessor (s), graphics processing unit(s), logic circuit(s), dedicated circuit(s), application-specific integrated circuit(s), programmable array logic, field-programmable gate array(s), controller(s), microcontroller(s), and/or other suitable hardware. The components, units, and/or modules may also include software control module(s) implemented with a processor or logic circuitry for example. The components, units, and/or modules may include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. One or more storage type media may include any or all of the tangible memory of computers, processors, or the like, or associated modules thereof, such as various semiconductor memories, tape drives, disk drives and the like, which may provide non-transitory storage at any time for software programming.

In addition, the terms "unit" and "control unit" included in names such as a vehicle control unit (VCU) may be terms widely used in the naming of a control device or controller configured to control vehicle-specific functions but may not be a term that represents a generic function unit. For example, each controller or control unit may include a communication device that communicates with other controllers or sensors to control a corresponding function, a memory that stores an operating system (OS) or logic commands and input/output information, and at least one vehicle controller that performs determination, calculation, selection, and the like necessary to control the function. The vehicle controller may also be referred to herein as a drive controller.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

FIG. 1 is a block diagram illustrating an autonomous vehicle according to an example of the present disclosure.

Referring to FIG. 1, according to an example of the present disclosure, an autonomous vehicle 100 may include a processor 110 and a plurality of sensors 130.

The plurality of sensors 130 may be mounted on the front, rear, and/or one or more sides of the autonomous vehicle 100. The plurality of sensors 130 may sense the surroundings of the autonomous vehicle 100 (e.g., in real time, while the autonomous vehicle 100 is parked or traveling) and may provide sensing information to the processor 110.

For example, the sensors 130 may include a radar 131, a camera 132, a lidar 133, and the like (e.g., parking sensor, light sensor, rain sensor, traction control sensor, anti-lock braking system sensor, tire pressure monitoring sensor, seatbelt sensor, airbag sensor, fuel sensor, emission sensor, throttle position sensor, etc.).

The radar 131 may comprise one or more radars mounted on the autonomous vehicle 100. The radar 131 may measure a relative speed and/or a relative distance with respect to a detected object, for example in conjunction with a wheel speed sensor (not shown) mounted on the autonomous vehicle 100.

The camera 132 may comprise one or more cameras mounted on the autonomous vehicle 100. The camera 132 may include, for example, a wide-angle camera. The camera 132 may capture images of objects in the vicinity of the autonomous vehicle 100 and/or images indicating states of the objects. The camera 132 may output/send image data based on such captured information (e.g., images of objects near the autonomous vehicle, such as within a distance threshold, or images indicating states of the objects). For example, the camera 132 may capture (e.g., in real time) one or more images of lines of a lane on which the autonomous vehicle 100 is currently traveling (e.g., is in). The camera may determine/obtain, from the one or more images, lane information of the current lane (e.g., in real time). The camera 132 may transmit the lane information to the processor 110, as will be described in more detail below.

The lidar 133 may comprise one or more lidars mounted on the autonomous vehicle 100. The lidar 133 may irradiate a laser pulse to an object, measure a time of return of the reflected laser pulse from the object within a measurement range, sense information such as a distance to the object, a direction of the object, a speed of the object, and the like, and output lidar data based on the sensed information. Here, the object may be an obstacle, a vehicle, a person, an object, etc., that exists outside the autonomous vehicle 100.

The processor 110 may extract specification information of the autonomous vehicle 100 from preset specifications of the autonomous vehicle 100, and/or may collect (e.g., request and/or receive), from/via the sensor 130, the lane information based on/associated with the current lane on which the autonomous vehicle 100 is traveling. For example, the processor 110 may be communicatively connected to one or more memories/storages of the autonomous vehicle 100. The one or more memories/storages may store instructions that, when executed by the processor 110 (e.g., one or more processors) configure the processor 110 to perform the methods/steps disclosed herein. The one or more memories/storages may also, or alternatively, store data for performing the methods/steps disclosed herein, such as preset specifications of the autonomous vehicle 100. For example, the processor 110 may retrieve, from the one or more memories/storages of the autonomous vehicles, the preset specifications of the autonomous vehicle 100.

The processor 110 may determine, based on the collected lane information and a first lane departure reference distance, whether a departure from lines of the current lane is occurring and/or going to occur. For example, the determining may be based on a comparison between the first lane departure reference distance and a predetermined distance.

If it is determined that the departure from the lines of the current lane occurs (is occurring, occurred, will occur) based on the first lane departure reference distance, the processor 110 may analyze the specifications of the autonomous vehicle 100 and/or the lane information to calculate a second lane departure reference distance calibrated from the first lane departure reference distance.

The processor 110 may control the driving of the autonomous vehicle 100 based on the calculated second lane departure reference distance.

For example, the processor 110 may calibrate a warning time of lane departure warning (LDW) (also herein an LDW warning time) and/or a control time of lane keeping assist (LKA) (also herein an LKA control time) based on the calculated second lane departure reference distance. The processor may control the driving of the autonomous vehicle 100 based on the calibrated LDW warning time and/or the calibrated LKA control time. This will be described in more detail below.

Figure 2:
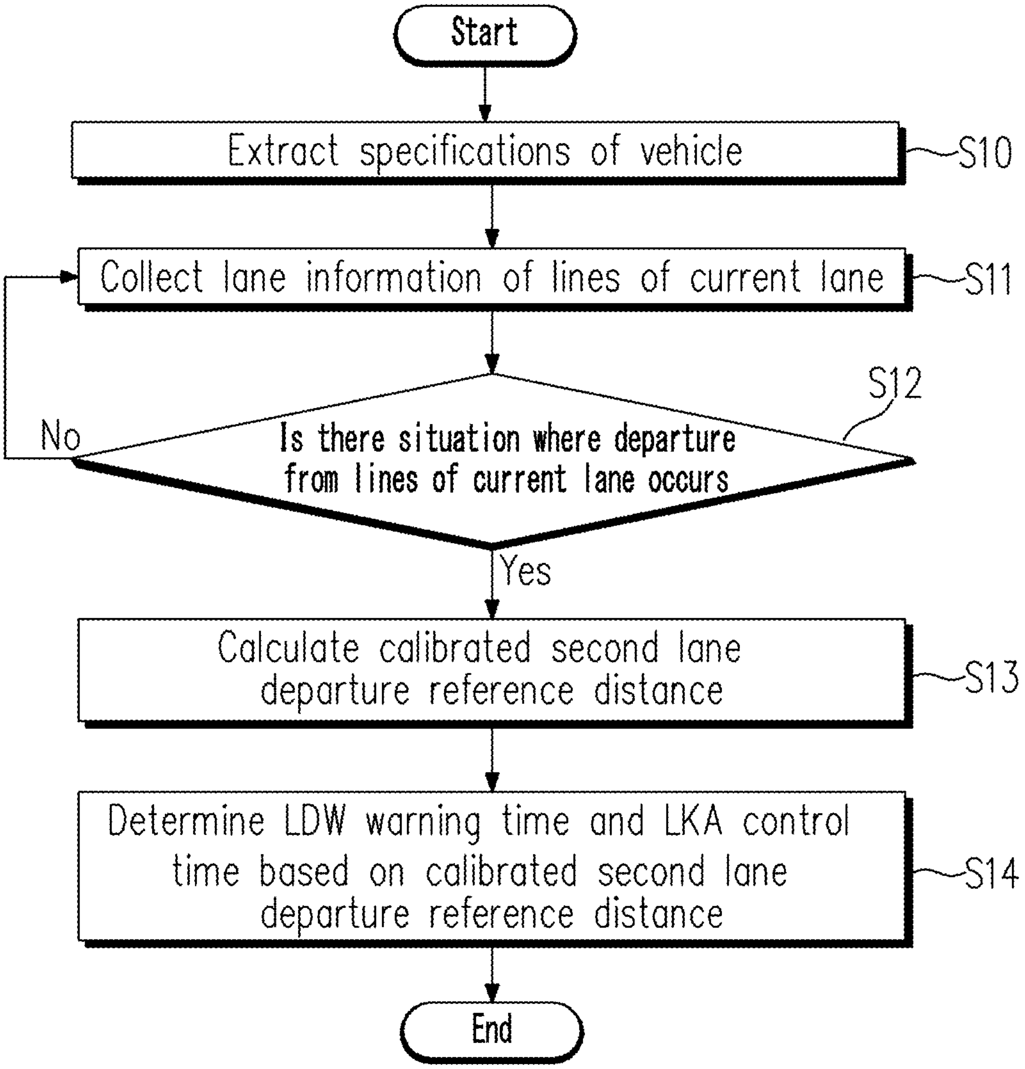
FIG. 2 is a flowchart illustrating a method of controlling an autonomous vehicle according to an example of the present disclosure.
Figure 3:
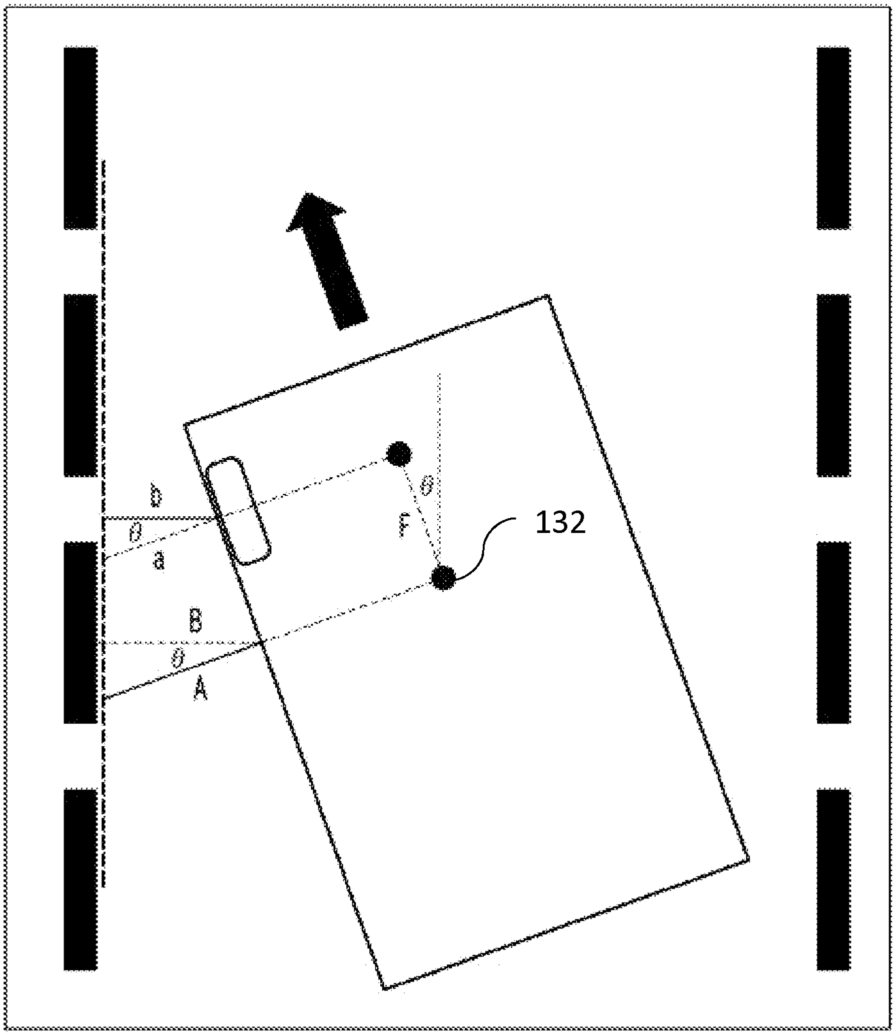
FIG. 3 is a diagram illustrating a second lane departure reference distance, under the control of a processor, according to an example of the present disclosure.
Figure 4:
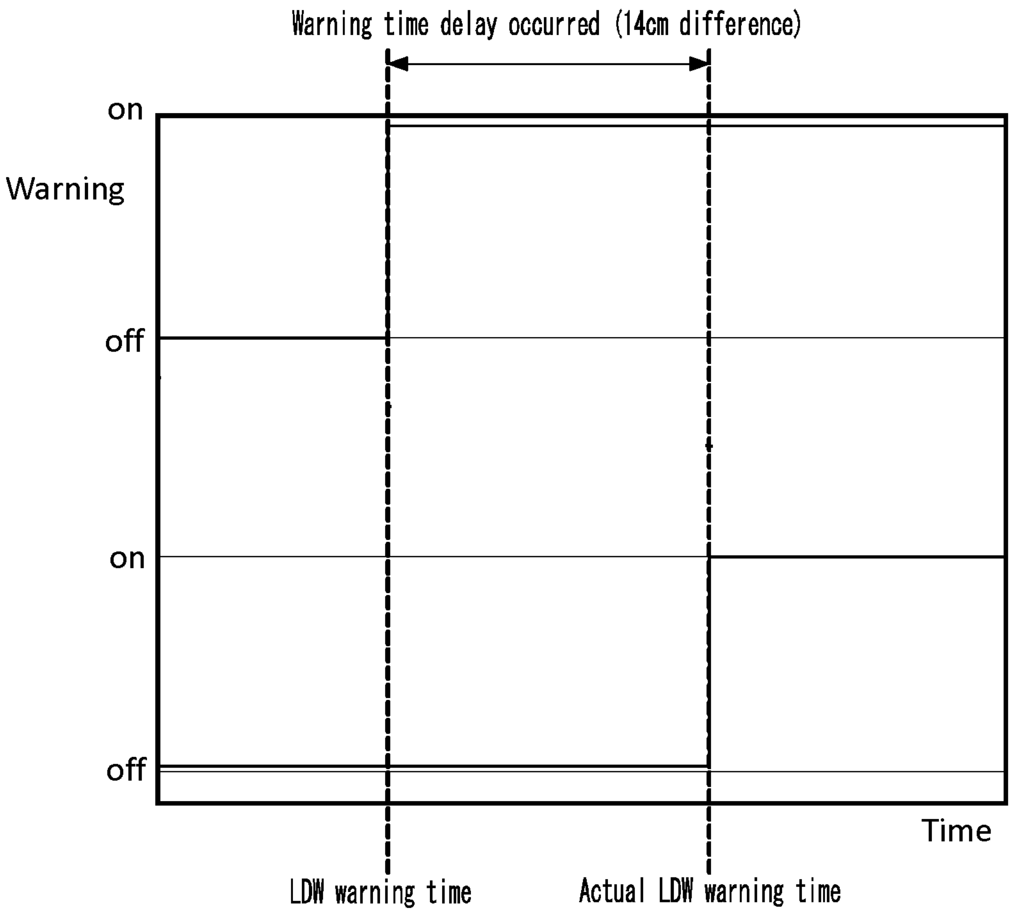
FIG. 4 and FIG. 5 are diagrams illustrating how a lane departure warning time changes when a second lane departure reference distance is applied, according to an example of the present disclosure.
Figure 5:
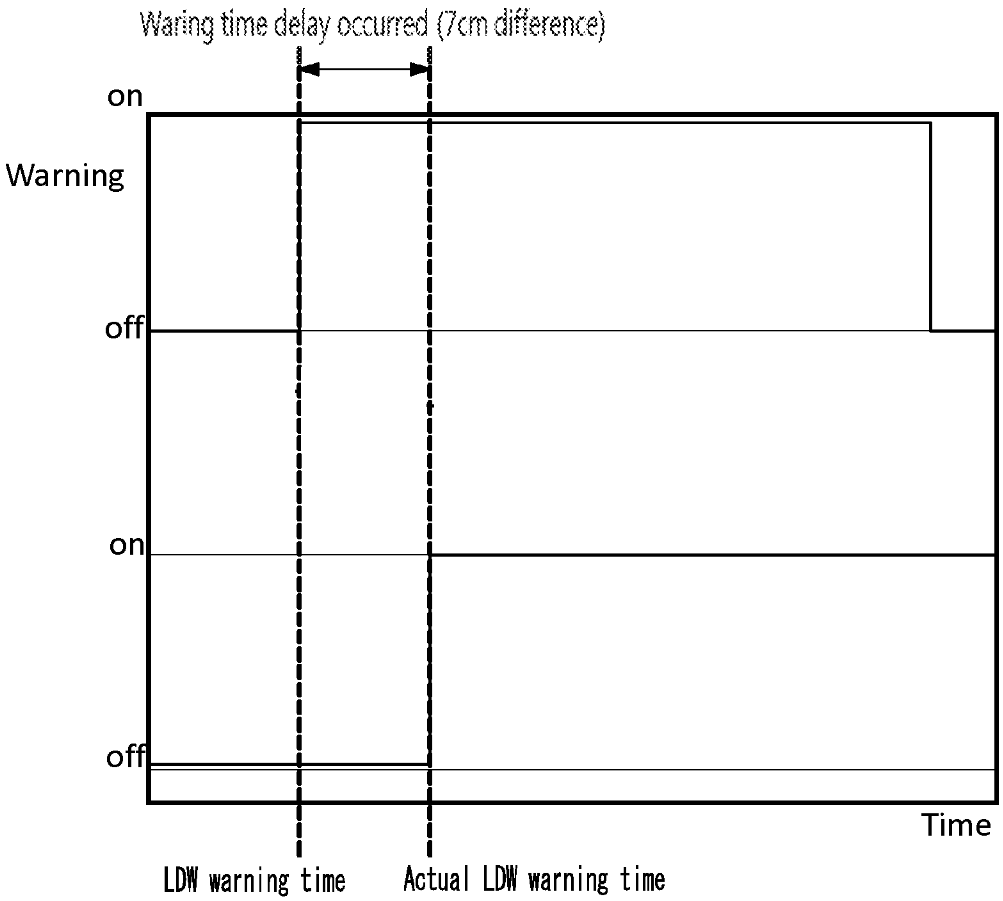

FIG. 2 is a flowchart illustrating a method of controlling an autonomous vehicle according to an example of the present disclosure. For convenience, FIG. 2 is described by way of an example in which the steps are performed by a processor circuit. One, some, or all steps of the example method of FIG. 2, or portions thereof, may be performed by one or more other circuits. One or some, steps of the example method of FIG. 2 may be omitted, performed in other orders, and/or otherwise modified, and/or one or more additional steps may be added. FIG. 3 is a diagram illustrating a second lane departure reference distance, under the control of a processor, according to an example of the present disclosure. FIGS. 4 and 5 are diagrams illustrating how a lane departure warning time changes when a second lane departure reference distance is applied, according to an example of the present disclosure.

Referring to FIGS. 2 and 3, a method of controlling an autonomous vehicle according to examples of the present disclosure is as follows.

The autonomous vehicle 100 may (e.g., via the processor 110) extract specification information of the autonomous vehicle 100 from preset specifications of the autonomous vehicle 100 (S10). For example, the preset specifications may be stored in one or more memories, and may be extracted (e.g., accessed, retrieved, requested and received, etc.) by the processor 110 from the one or more memories.

The specification information of the autonomous vehicle 100 may include a width of the autonomous vehicle 100 and/or a longitudinal distance value. The longitudinal distance value may be a longitudinal distance between a front wheel axle of the autonomous vehicle 100 and the camera 132 of the autonomous vehicle 100 (e.g., a distance, along the longitudinal/front-to-back direction of the car, between the camera 132 and a front wheel of the autonomous vehicle 100, and/or rear wheel of the autonomous vehicle 100 if the autonomous vehicle 100 is moving in reverse). For example, the specification information of the autonomous vehicle 100 may be input to/stored in the one or more memories (e.g., a storage device or the like) of the autonomous vehicle 100 when the autonomous vehicle 100 is produced/manufactured and/or when the camera 132 is installed. However, examples are not limited thereto, and as needed, the specification information may be input as the longitudinal distance value is changed by a change in the front wheels mounted on the autonomous vehicle 100, a change in the position of the camera 132 disposed in the front of the autonomous vehicle 100, a change in the model of the camera 132, or the like, after the production of the autonomous vehicle 100.

The autonomous vehicle 100 (e.g., by the processor 110 and/or under control of the processor 110) may collect, via/from the sensors 130, lane information from a current lane on which the autonomous vehicle 100 is traveling (S11). The sensors 130 may comprise the camera 132 which may be a front-facing camera disposed in the front of the autonomous vehicle 100. However, examples are not limited thereto, and any sensor, instead of or in addition to the camera 132, that may accurately collect the lane information from the current lane on which the autonomous vehicle 100 is traveling may be used. The camera 132 may be placed anywhere on the vehicle and/or may comprise a plurality of cameras at various locations on the autonomous vehicle 100.

The lane information may include one or more of a line distance (and/or width) of the current lane (e.g., a distance between lines of/defining the current lane), a curvature of the lines of the current lane, and/or a heading angle value between the lines of the current lane and the autonomous vehicle 100.

The autonomous vehicle 100 (e.g., via the processor 110 and/or under control of the processor 110) may receive and/or collect (e.g., in real time) the lane information including the line distance and the heading angle value, from the front-facing camera 132.

The autonomous vehicle 100 (e.g., the processor 110 and/or under control of the processor 110) may determine, based on the collected lane information and a first lane departure reference distance (e.g., based on whether the lane information satisfies a criterion indicating lane departure is occurring/will occur, e.g., by approaching a line of the lane and/or a proximity to the line of the lane), whether there is a situation where a departure from the lines of the current lane occurs (S12). The autonomous vehicle 100 may, based on the first lane departure reference distance and via the processor 110, determine whether there is a situation where a departure from a left line or a right line of the current lane occurs (e.g., is occurring/has occurred).

The first lane departure reference distance may be determined based on a value obtained by subtracting, from a recognized line distance value obtained by the camera 132, a value obtained based on placement of the camera on the autonomous vehicle 100 in a width direction of the autonomous vehicle 100. For example, in a case that the camera 132 is placed at a center line of the vehicle, the first lane departure reference distance may be set based on a value obtained by subtracting, from the recognized line distance value obtained by camera 132 (a distance to the lane line in a direction perpendicular to the travel direction of the vehicle), a value obtained by dividing the width of the autonomous vehicle 100 in half, as shown in FIG. 3. For example, the recognized line distance value may be a distance from the camera 132 to the inner lane (length of line A plus the extending dashed line to the camera 132), and the first lane departure reference distance may be the line A in FIG. 3.

It may be determined, due to a difference between the first lane departure reference distance and the preset distance (e.g., if the first lane departure reference distance is less than or equal to the preset distance), that there is a situation where the departure from the lines of the current lane occurs/is occurring. Based on determining that the lane departure situation is occurring, the autonomous vehicle 100 (e.g., via the processor 110) may analyze the specification information and/or the lane information to determine/calculate a second lane departure reference distance, calibrated from/based on the first lane departure reference distance.

Referring to FIG. 3, the second lane departure reference distance may be a distance between an inner side of a line of the current lane and an outer side of the center of a front wheel, closest to the line, of the autonomous vehicle 100. The second lane departure reference distance may be a distance perpendicular to the line of the current lane.

The processor 110 may use a predetermined logic program to calculate the second lane departure reference distance using the following equations.

$$\frac{B}{A} = \frac{b}{a}$$

$$\begin{aligned} b &= \frac{B}{A}\star a \\ &= \cos\theta\star(A - F*\tan\theta) \\ &= A\cos\theta - F\sin\theta \end{aligned}$$

Here, "θ" denotes a camera-recognized heading angle value (e.g., an angle between a direction of travel of the autonomous vehicle 100 relative to a direction of the lane); "A" denotes the first lane departure reference distance (i.e., a value obtained by subtracting, from a camera-recognized lane distance value, i.e., a distance from the camera to the lane in a direction perpendicular to the direction of travel of the autonomous vehicle 100, a value obtained from vehicle width/2 (e.g., A=camera-recognized lane distance value—vehicle width/2 and/or a distance from the camera to a side of the vehicle towards the lane line—this would be the vehicle width/2 if the camera is placed at a center line of the vehicle); "F" denotes a longitudinal distance value from the camera to the a front axle in a longitudinal direction of the vehicle (e.g., to the center of the front axle when the camera is placed in a center of, "a" denotes a value obtained by multiplying "A" by F tan θ, and "B" denotes a value obtained by multiplying "a" by cos θ.

The autonomous vehicle 100 (and/or the processor 110) may control the driving of the autonomous vehicle 100 based on the calculated second lane departure reference distance.

The autonomous vehicle 100 (and/or the processor 110) may calibrate, based on the calculated second lane departure reference distance, an LDW warning time and/or an LKA control time.

For example, referring to FIGS. 4 and 5, FIG. 4 shows a difference between an ideal LDW warning time (e.g. when a tire of the vehicle treads on the lane line) and an actual system warning time based on the first lane departure reference distance (e.g., as may be determined in existing systems), and FIG. 5 shows a difference between an LDW warning time and an actual system warning time based on a second lane departure reference distance (e.g., as disclosed herein). In this case, a departure lateral velocity is set to 1.0 meters per second (m/s).

As shown in FIG. 4, a warning time difference between the ideal LDW warning time and the actual system warning time based on the first lane departure reference distance may be 10 centimeters (cm) or more, potentially failing the EuroNCAP, NHTSA, and GSR evaluation scenarios.

For example, in the GSR ELKS regulation or EuroNCAP evaluation scenario, the LDW warning must be triggered before the outmost tire of the vehicle departs by 30 cm or more, and there is a high likelihood that the regulation will not be satisfied with the first lane departure reference distance when using the conventional method, due to a delay of 10 cm or more.

However, as shown in FIG. 5, the difference between the ideal LDW warning time and the actual system warning time based on the second lane departure reference distance may be 7 cm or more, satisfying the EuroNCAP, NHTSA, and GSR evaluation scenarios.

Accordingly, the autonomous vehicle 100 may, via processor 110, calibrate the LDW warning time and the LKA control time based on the calculated second lane departure reference distance.

Accordingly, under the control of the processor 110, the autonomous vehicle 100 may control the driving of the autonomous vehicle 100 based on the calibrated LDW warning time and the calibrated LKA control time to improve the reliability of autonomous driving or driving.

An object of the present disclosure is to provide an autonomous vehicle and a control method thereof that may accurately measure a distance perpendicular to a line between an inner side of the line and an outer side of the center of a front tire using at least one sensor, thereby enabling lane departure warning (LDW) and lane keeping assist (LKA) control to be executed at a correct time.

The technical objects to be achieved by the present disclosure are not limited to those described above, and other technical objects not described above may also be clearly understood by those skilled in the art from the following description.

To solve the preceding technical problems, according to an example of the present disclosure, there is provided a method of controlling a vehicle, the method comprising obtaining, by a processor executing computer instructions stored in a memory, via sensors, lane information of a lane in which the vehicle is traveling, determining, by the processor, an occurrence of a preset departure situation, based on the lane information and a first lane departure reference distance, determining a second lane departure reference distance based on specification information of the vehicle and the lane information, and controlling, by the processor, driving of the vehicle based on the second lane departure reference distance.

The method may further include adjusting a warning time of a lane departure warning (LDW) and a control time of a lane keeping assist (LKA) based on the second lane departure reference distance, and controlling the driving of the vehicle based on the LDW warning time and the LKA control time.

The specification information may include a width of the vehicle and a longitudinal distance between a front wheel axle of the vehicle and a camera disposed at the The lane information may include a distance between both lines of the lane, a curvature of a line of the lane, and an angle between the line of the lane and the vehicle.

The determining the second lane departure reference distance may include determining a second lane departure reference distance based on the width, the longitudinal distance, and the angle.

The determining the second lane departure reference distance based on the width, the longitudinal distance, and the angle may include determining a second lane departure reference distance as a distance perpendicular to the line of the current lane between an inner side of the line of the lane and an outer side of a center of a front wheel of the vehicle.

To solve the preceding technical problems, according to an example of the present disclosure, there is provided a vehicle comprising sensors and a processor configured to execute computer instructions stored in a memory, wherein the processor is, by executing the computer instructions, further configured to obtain, via the sensors, lane information of a lane in which the vehicle is traveling, determine an occurrence of a preset departure situation, based on the lane information and a first lane departure reference distance, determine a second lane departure reference distance based on specification information of the vehicle and the lane information, and control driving of the vehicle based on the second lane departure reference distance.

The processor may be configured to adjust a warning time of a lane departure warning (LDW) and a control time of a lane keeping assist (LKA) based on the second lane departure reference distance, and control the driving of the vehicle based on the LDW warning time and the LKA control time.

The specification information may include a width of the vehicle and a longitudinal distance between a front wheel axle of the vehicle and a camera disposed at the The lane information may include a distance between both lines of the lane, a curvature of a line of the lane, and an angle between the line of the lane and the vehicle.

The processor may be configured to determine a second lane departure reference distance based on the width, the longitudinal distance, and the angle.

The processor may be further configured to determine the second lane departure reference distance as a distance perpendicular to the line of the current lane between an inner side of the line of the lane and an outer side of a center of a front wheel of the vehicle.

The autonomous vehicle and the control method configured as described above according to examples of the present disclosure may accurately calculate a difference between the autonomous vehicle and a lane through predetermined logic to which a heading angle value and a front wheel axle-and-camera longitudinal distance value are applied and may apply LDW and LKA control at an accurate time, thereby improving the stability of autonomous driving or driving.

The effects that can be achieved from the present disclosure are not limited to those described above, and other effects not described above may also be clearly understood by those skilled in the art from the following description.

The examples of the present disclosure described herein may be implemented as computer-readable code on a medium in which a program is recorded. The computer-readable medium may include all types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, and the like.

Accordingly, the preceding detailed description should not be construed as restrictive but as illustrative in all respects. The scope of the examples of the present disclosure should be determined by reasonable interpretation of the appended claims, and all changes and modifications within the equivalent scope of the present disclosure are included in the scope of the present disclosure.

What is claimed is:

1. A method of controlling a vehicle, comprising:
receiving, by a processor executing computer instructions stored in a memory and via at least one sensor of the vehicle, lane information of a lane in which the vehicle is traveling;
determining, based on specification information of the vehicle and the lane information, a second lane departure reference distance; and
controlling, by the processor and based on the second lane departure reference distance, driving of the vehicle,
wherein the determining the second lane departure reference distance is based on a width of the vehicle, a longitudinal distance between a front wheel axle of the vehicle and a camera of the vehicle, and an angle between a line of the lane and a travel direction of the vehicle.

2. The method of claim 1, further comprising:
determining, based on the lane information and a first lane departure reference distance, whether the vehicle departs from the lane,
wherein the first lane departure reference distance is determined based on the width of the vehicle and a first distance between a line of the lane and a position of the camera on the vehicle, and
wherein the determining whether the vehicle departs from the lane comprises determining that the vehicle has departed from the lane based on the first lane departure reference distance being less than a preset distance.

3. The method of claim 1, further comprising:
adjusting, based on the second lane departure reference distance, a warning time of a lane departure warning (LDW) and a control time of a lane keeping assist (LKA); and
controlling, based on the warning time of the LDW and the control time of the LKA, the driving of the vehicle.

4. The method of claim 1, wherein the specification information comprises:
the width of the vehicle and the longitudinal distance between the front wheel axle of the vehicle and the camera of the vehicle, wherein the at least one sensor comprises the camera.

5. The method of claim 1, wherein the lane information comprises:
a distance between two lines defining the lane, a curvature of a line of the two lines, and the angle.

6. The method of claim 1, wherein the second lane departure reference distance is defined as a second distance between an inner side of the line and an outer side of a center of a front wheel of the vehicle, and wherein the second distance is perpendicular to the lane.

7. The method of claim 1, further comprising:
determining, based on the width of the vehicle and a first distance between a line of the lane and a position of the camera on the vehicle, a first lane departure reference distance; and
determining, based on the lane information and the first lane departure reference distance, whether the vehicle departs from the lane.

8. The method of claim 7, wherein the first lane departure reference distance is a value obtained by subtracting the width of the vehicle from the first distance.

9. The method of claim 7, wherein the determining whether the vehicle departs from the lane comprises determining, based on the first lane departure reference distance, whether the vehicle is departing from a current lane to a left lane or to a right lane.

10. The method of claim 7, further comprising, in response to determining that the vehicle has departed from the lane, calibrating the first lane departure reference distance to determine the second lane departure reference distance.

11. A vehicle, comprising:

at least one sensor; and a processor configured to execute computer instructions stored in a memory, wherein the computer instructions are, when executed by the processor, configured to cause the vehicle to:

receive, via the at least one sensor, lane information of a lane in which the vehicle is traveling;

determine, based on specification information of the vehicle and the lane information, a second lane departure reference distance; and control, based on the second lane departure reference distance, driving of the vehicle, wherein the second lane departure reference distance is determined based on a width of the vehicle, a longitudinal distance between a front wheel axle of the vehicle and a camera of the vehicle, and an angle between a line of the lane and a travel direction of the vehicle.

12. The vehicle of claim 11, wherein the computer instructions are, when executed by the processor, further configured to cause the vehicle to:

determine, based on the lane information and a first lane departure reference distance, whether the vehicle departs from the lane, wherein the first lane departure reference distance is determined based on the width of the vehicle and a first distance between a line of the lane and a position of the camera on the vehicle, and wherein the determining whether the vehicle departs from the lane comprises determining that the vehicle has departed from the lane based on the first lane departure reference distance being less than a preset distance.

13. The vehicle of claim 11, wherein the computer instructions are, when executed by the processor, further configured to cause the vehicle to:

adjust, based on the second lane departure reference distance, a warning time of a lane departure warning (LDW) and a control time of a lane keeping assist (LKA); and control, based on the warning time of the LDW and the control time of the LKA, the driving of the vehicle.

14. The vehicle of claim 13, wherein the specification information comprises:

the width of the vehicle and the longitudinal distance between the front wheel axle of the vehicle and the camera of the vehicle, wherein the at least one sensor comprises the camera.

15. The vehicle of claim 14, wherein the lane information comprises:

a distance between two lines defining the lane, a curvature of a line of the two lines, and the angle.

16. The vehicle of claim 14, wherein the second lane departure reference distance is defined as a second distance between an inner side of the line of the lane and an outer side of a center of a front wheel of the vehicle, wherein the second distance is perpendicular to the lane.

17. The vehicle of claim 11, wherein the computer instructions are, when executed by the processor, further configured to cause the vehicle to:

determine, based on the width of the vehicle and a first distance between a line of the lane and a position of the camera on the vehicle, a first lane departure reference distance; and determine, based on the lane information and the first lane departure reference distance, whether the vehicle departs from the lane.

18. The vehicle of claim 17, wherein the first lane departure reference distance is a value obtained by subtracting the width of the vehicle from the first distance.

19. The vehicle of claim 17, wherein the computer instructions are, when executed by the processor, configured to cause the vehicle to:

determine, based on the first lane departure reference distance, whether the vehicle is departing from a current lane to a left lane or to a right lane.

20. The vehicle of claim 17, wherein the computer instructions are, when executed by the processor, configured to cause the vehicle to:

in response to determining that the vehicle has departed from the lane, calibrate the first lane departure reference distance to determine the second lane departure reference distance.

* * * * *